(12) United States Patent
Petersen et al.

(10) Patent No.: US 10,041,845 B2
(45) Date of Patent: Aug. 7, 2018

(54) FORCE SENSOR DEVICE

(71) Applicant: FIRST SENSOR MOBILITY GMBH, Dresden (DE)

(72) Inventors: Lars Petersen, Dresden (DE); Sebastian Hagedorn, Dresden (DE)

(73) Assignee: FIRST SENSOR MOBILITY GMBH, Dresden (DE)

( * ) Notice: Subject to any disclaimer, the term of this patent is extended or adjusted under 35 U.S.C. 154(b) by 0 days.

(21) Appl. No.: 15/463,281

(22) Filed: Mar. 20, 2017

(65) Prior Publication Data

US 2017/0268938 A1 Sep. 21, 2017

(30) Foreign Application Priority Data

Mar. 18, 2016 (DE) .................. 10 2016 105 126

(51) Int. Cl.
*G01L 1/04* (2006.01)
(52) U.S. Cl.
CPC ...................... *G01L 1/04* (2013.01)
(58) Field of Classification Search
CPC ............ G01L 1/04; G01L 1/2231; G01L 5/22
USPC ..................................... 73/862.642
See application file for complete search history.

(56) References Cited

U.S. PATENT DOCUMENTS

| | | | | |
|---|---|---|---|---|
| 2,719,430 A | * | 10/1955 | Dillon | G01L 1/04 73/862.642 |
| 2,962,893 A | * | 12/1960 | Ormond | G01L 1/04 73/862.642 |
| 8,733,182 B2 | * | 5/2014 | Huizinga | B60T 17/22 73/862.045 |
| 2014/0000388 A1 | * | 1/2014 | Sato | G01L 1/04 73/862.642 |

FOREIGN PATENT DOCUMENTS

| | | |
|---|---|---|
| DE | 103 50 085 A1 | 6/2005 |
| EP | 1462784 A1 | 9/2004 |
| EP | 1980832 A2 | 10/2008 |
| EP | 2546625 A1 | 1/2013 |

OTHER PUBLICATIONS

European Patent Office Search Report dated Aug. 14, 2017 issued in corresponding European Application No. EP17161928.

* cited by examiner

*Primary Examiner* — Max Noori
(74) *Attorney, Agent, or Firm* — Heslin Rothenberg Farley & Mesiti P.C.

(57) ABSTRACT

A force sensor device for determination of a measurement value of a force and generation of an electrical signal based on the measurement value includes a force ring with a force application surface and a support surface for support of a circuit board, on which passive and active electronic components are arranged. The circuit board is mechanically or adhesively fixated on the support surface. At least one force transducer is electrically connected with the circuit board, and arranged and configured at the force ring in such a way that deformations of the force ring, as a result of an axial force applied on the force ring, are measured. A housing lid is connected with the force ring, so that the force ring and the housing lid enclose the circuit board and the force transducer. Also provided is an external connection for picking up an electrical signal.

8 Claims, 3 Drawing Sheets

Fig. 1A
Fig. 1B
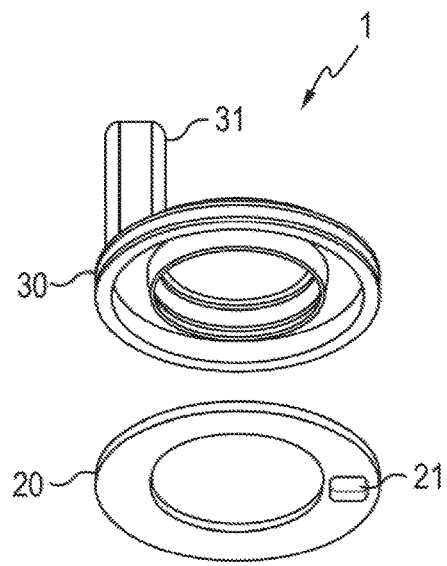
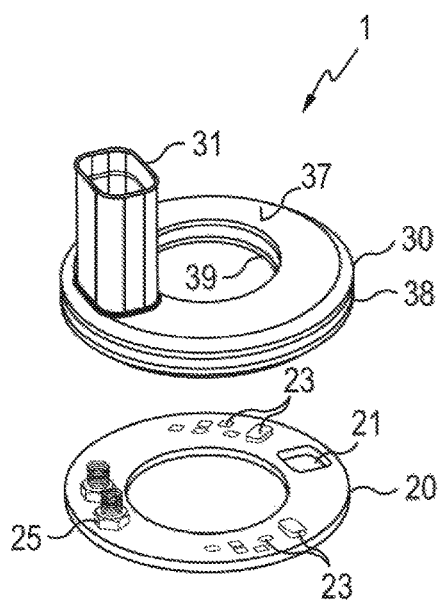
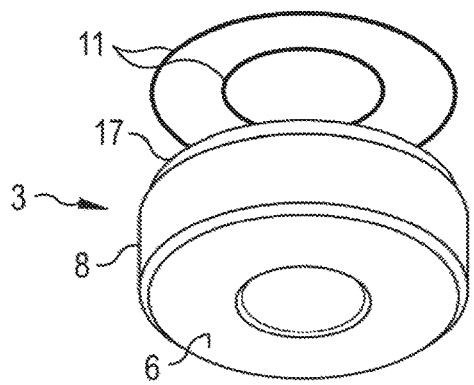
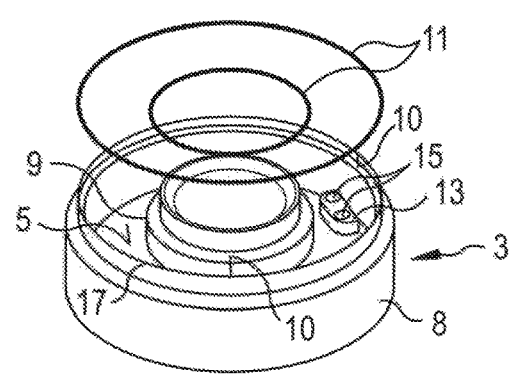

FORCE SENSOR DEVICE

CROSS REFERENCE TO RELATED APPLICATIONS

This application claims priority of German application No. 10 2016 105 126.8 filed on Mar. 18, 2016, the entire disclosure of this application is hereby incorporated herein by reference.

BACKGROUND OF THE INVENTION

The invention generally refers to a force sensor for the measurement of axially occurring forces. It specifically refers to such a force sensor for which a measurement axis runs parallel to an axis of the force sensor.

For controlling or regulating a force, a force sensor is frequently used, which is arranged in the path of the force in such a way that the force to be adjusted acts on the sensor directly or indirectly through suitable means of transmission. Such devices are generally referred to as sensors, which qualitatively and quantitatively determine a measured value, in the present case a measured value associated with the force, and which transform this measured value into an electrical signal for further processing, so that it is available for the control or regulation of the force. Such force sensors are required for a variety of applications, such as for electromagnetic brakes within the automotive sector, for which the braking force, which acts upon the brake shoes, is determined and regulated by a force sensor.

Force sensors which are configured as a ring and which are configured on a shaft, axle, punch or any other cylindrical component that transmits the force are currently known as state of the art. Due to the diversity of applications of a force sensor, the 'cylindrical' shape of the component, which holds the ring-shaped force sensor, shall be known by its general definition, namely as a lateral surface, which is made up of a multitude of lateral lines, which connect the same two points of two identical, closed curves moved in parallel to each other along the length of the lateral line. The closed curves may be circles of a circular cylinder or ellipses of an elliptical cylinder or free curves. The ring-shaped force sensor is clearly adapted to the shape of the lateral surface.

As a result of the direct or indirect application of a force on the ring-shaped force sensor, the force sensor deforms, so that the to be measured force is deduced from the change in distance or length and the force is determined from the force-displacement-ratio. For instance in DE 103 50 085 A1, the control of the braking force of brake shoes are described. Therein, a circular ring-shaped force sensor, which has a C-shaped profile, is arranged on the casing of a compression die. The force, which is applied on the brake shoes through the compression die, acts in form of a reactive force of the brake shoes via suitable components of the brake on the force sensor and deforms the leg of a C-profile. Through strain measurements, the deformation of the ring and, thereof by means of a strain measurement system, the force acting on the brake shoes can be determined. Further areas of application for force sensors, which include a force ring, are known.

SUMMARY OF THE INVENTION

There is a necessity to provide such force sensors as a compact component, which besides the force transducer also includes the required electronics for the creation of a signal, pre-processing of a signal and/or processing of a signal and which reliably and permanently protects the components from environmental influences. Further, consistently replicable measurement conditions should be guaranteed. Often, the mechanical, thermal and chemical influences are very harsh, specifically for automotive applications.

Further, it is desirable that the manufacturing in respect to materials, quantity as well as configuration of the required components and in respect to the necessary methods is designed in a cost and energy efficient manner.

A force sensor device is presented, which is configured for the determination of a measured value of a force as well as for the generation of an electrical signal, based on the measured value, and which includes a force ring and a housing lid as housing components, wherein the latter is connected to the force ring, so that the force ring and housing lid enclose the electrical components completely. Force ring and housing lid together form the housing of the force sensor device.

BRIEF DESCRIPTION OF THE DRAWINGS

FIG. 1A a perspective exploded view of an embodiment of a force sensor device, as seen from below and FIG. 1B a perspective exploded of an embodiment of a force sensor device according to FIG. 1A, as seen from above;

Figure 2:
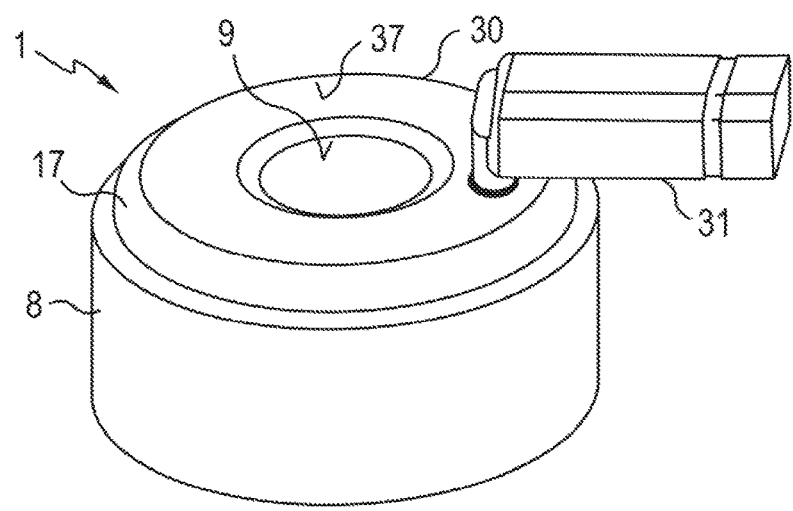
FIG. 2 a perspective view of another embodiment of a force sensor device.

The drawings and the following description of the drawings below describe the prior disclosed force sensor device only schematically for a better understanding. They do not claim to be complete and/or a proportionality of the illustrations. The same reference numbers in the drawings indicate the same functional elements. The embodiments and details are merely an example and shall not be considered as limiting. The expert would combine or modify the illustrated and prior described features for other embodiments in different ways, in as far as this appears appropriate to him.

DETAILED DESCRIPTION OF THE INVENTION

The force ring includes an external force application surface, upon which the forces to be determined in the state of application act, so that these forces may be recorded and measured. In accordance with the above descriptions of the state of the art dependent on different measurement conditions, such as the respective application and the path of the force or the type and position of the force transducer within the force sensor device connected thereto, the forces may be picked up directly from the path of the force, or, for the purpose of an indirect application of the force, the forces may be transmitted through a suitable means of transmission on the force application surface.

The force ring further includes an internal support surface for the support of at least one circuit board. Depending on the shape of the force ring, the force application surface and the support surface can be opposite each other, such as when forming both surface areas of a board-shaped, for instance a circular ring-shaped configured, force ring or a base plate of the force ring. Alternatively, other shapes of the force rings, which provide a suitable support surface for the circuit board, are possible however. The currently known circuit boards have designs that vary widely, so that a single even surface does not necessarily need to be considered. Therefore, completely or partly flexible circuit boards are known, so that curved support surfaces or support surfaces made up of partial surfaces, which in addition may be inclined towards each other, are also suitable.

The terms 'external' and 'internal' refer to the force sensor device in its final state, i.e. when the housing lid and the force ring are connected to each other and form a gap, in which the electrical components are located. This gap forms the inside space of the housing, in which the support surface is inevitably located. The force application surface is then clearly located on the outside, i.e. on the outside wall of the housing.

The force ring, as well as the housing lid, may consist of different materials, such as a metallic material, a plastic material, a combination of both or other materials, dependent on the measurement range and/or the application.

The force sensor device further includes the circuit board. Passive and active electronic components are arranged on the circuit board, which are needed to operate the force transducer as well as to receive a signal from the force transducer and to lead to further processing. The further processing may at least in part take place already on the circuit board, alternatively in part or completely through external devices.

The circuit board is held in place on the support surface mechanically or adhesively. Both options are executed in such a way that a permanently consistent fixation is realized without an additional component of the force sensor device. Preferably, the fixation is realized without any further component of the force sensor, so that a simple and cost effective construction of the force sensor is possible. For instance, the fixation may be realized through full-surface or partial adhesion of the circuit board on the support surface, such as by means of flexible glues or through suitable support means of the force ring, with which the circuit board can be pressed onto the support surface. Also, a combination of the two is possible.

A permanent fixation of the circuit board under the stress and the thermal conditions is desirable in order to keep such parameters constant and under control, which may have an impact on the measurement results in any way, such as the measurement conditions themselves or the conditions for a signal transmission. The latter are to be taken into account in case of a spatial separation between the force transducer and the circuit board.

The force sensor device further includes at least one sensor element, in the following described as force transducer, which is electrically connected with the circuit board, and which is arranged and configured at the force ring in such a way that it perceives deformations of the force ring as a result of an axial force acting upon the force ring. Optionally, several force transducers can be used, which can be used separately or combined as pairs or multi-part groups.

Provided that the force sensor includes several force transducers, these may be distributed on the force ring. For instance, two force sensors are arranged in such a way, so that they are exposed to the same stress situation through the force ring. In this way, a redundant measurement situation can be realized, which may be supported by redundant circuits and components on the circuit board. Two, three, four or more force transducers have proved to be advantageous depending on the design of the force ring, whereby an optimisation in respect to functional safety and cost is reasonable.

Such force transducers currently are known with various different designs, such as piezoelectric force transducers, resistive force transducer, spring element force transducer or others. Future developments of force transducers may be integrated in the force sensor device analogously.

The position of the force transducer at the force ring first of all is determined through its function and may vary accordingly dependent on the available surfaces of the force ring. For instance, it may be positioned on the support surface or another surface. Further, it is of advantage, dependent on the design of the force ring, but not necessary, that the force transducer is arranged inside the housing. The arrangement 'at' the force ring includes that the force transducer is directly connected with the force ring, so that the applied force can be picked up directly. The force transducer is not arranged on the circuit board, i.e. it is spatially separated from the force transducer.

The force sensor device further includes an external connection for picking up an electrical signal. Position and design may be dependent on the respective design of the force sensor device and/or the situation of installation during use. A source of the signal is clearly the circuit board due to the intended purpose of the force sensor device.

The described force sensor device requires only two further components, which serve as housing components, the force ring and the housing lid, besides the electronic components, i.e., the force transducer, circuit board and the electrical external connection. These enclose and at the same time protect the electronic components in their position relative to the force ring. In this way, the cost of material, the cost of energy and the manufacturing cost could be considerably reduced for a completely enclosed and protected measurement system compared with the state of the art. Pre-fabrication processes are possible, which provide two groups of components, which can be connected to each other in a final joining process.

The first group of components consists of the force ring with the force transducer and the circuit board fixated on the support surface of the force ring. The second group of components comprises the housing lid.

The housing lid closes the force sensor device to protect the internal components from damaging influences and/or the measurement from interfering influences of the environment. The housing lid is connected with the force ring, optionally through the use of one or more seals, so that the force ring and the housing lid enclose the circuit board. The housing lid and the force ring in this way form a closed, optionally sealed, housing.

The housing lid may consist of various materials and may include suitable shapes, which are suitable for the purpose of protection and the type of application of the force sensor.

The housing lid, and optionally or additionally also the force ring, may include an external electrical contact for the electrical connecting of the force sensor device to an external control device, displays or other devices. The design of the contact correlates with internal contacts, which for instance may be realized on the circuit board. Known embodiments of contacts can be used, such as spring contacts, contact pads, sockets and plugs etc. Alternatively, a non-detachable connection cable, which may be flexible, may be arranged.

The above stated fixation of the circuit board on the support surface may involve besides the mechanical connection the securing of the position of the circuit board in relation to the support surface. The securing of the position may for instance be required where there is a risk of a shift due to a force component that runs laterally, parallel to the support surface. Such a force component is present for instance during an application of force, which includes a torsion component. In these situations, the force ring may include suitable support means, which realize a mechanical shift protection and/or twist protection of the circuit board. Such protections usually provide surfaces, which rest against an edge of the circuit board, so that their shift in direction of the relevant surface is prevented. For instance, several pins or other elevations may be arranged on the support surface, which engage with corresponding recesses in the circuit board.

In a comparable manner, the force sensor device as a whole may be protected against twisting in an installation position, which is caused by a torsion component of the applied force. For this purpose, the force sensor device in another arrangement may have a suitable means for securing a position of the force sensor device on one of its outer wall surfaces, in the following described as positioning means. The positioning means may for instance be arranged on the housing lid. Provided that the design of the outer wall surfaces as well as the situation of installation of the force sensor device support it, other locations of the positioning means can be used. Such a positioning means can be a spike onto which an external holding device, that is not part of the force sensor device, clasps. Further suitable positioning means are possible as an alternative or in addition. If the force sensor device includes a connecting means, as described in the following, the connecting means may also include such a positioning means.

The shape of the force ring with the internal support surface and external force application surface may be designed in a variable manner. According to various embodiments of the force sensor device, the force ring may be configured as a board, as already exemplified above, whose two surfaces, which lay opposite to each other, form the force application. Alternatively, the force ring may have a trough-shaped profile. Both variants support the cost effective and efficient manufacturing as well as an automated and a reproducible connection of the circuit board with the force ring. In the trough-shaped embodiment of the force ring, the support surface may be the inner bottom surface of the trough, whereby the fixation and the securing of the position of the circuit board may be supported through the upright side walls of the trough.

The force transducer may be arranged lying on a surface of the force ring, which is located inside the housing, or optionally on a for one or more force transducers designed surface. In this way, this support surface may be configured in different arrangements of the force ring in such a way that a section of this support surface for the support of at least one force transducers forms a pedestal surface, which lays above the surrounding support surface, and/or at least one section of the support surface has an inclination within the range of $0<\beta\leq1°$ compared to the surrounding support surface. Inclinations within the range of $0<\beta\leq0.8°$ or up to or equal to $0.5°$ have already shown to have an impact on the measurement result.

Such pedestals or ramps may include one or more, the latter especially for redundantly used, force transducers. The pedestals or ramps may be used simultaneously for the securing of the position of the circuit board. In addition, the sensitivity of the measurement may be positively influenced through the arrangement of the force transducer on a pedestal and/or with a small inclination compared to the support surface. Through known manufacturing methods, the inclinations of surfaces are created very precisely by tenths of a degree, so that intermediate steps within the specified angle range can be used.

Various other arrangements support the connection of the force ring with the housing lid, so that the above described variable design of the force ring and variable shapes of the housing lid can be used. In this way, the connection of the force ring with the housing lid may be realized by means of a connecting means which is arranged at the force ring or at the housing lid or which is configured as a separate component of the force sensor device. Such a connecting means may be specifically coordinated with the connection method in regards to shape and/or material, so that the materials for the force ring and/or housing lid are chosen according to their primary function. In addition, such a connecting means may increase the installation space in the housing and adapt it—within reasonable limits—in case of a deviating shape of the force ring and the housing lid.

The connection of the force ring with the housing lid can be realized through known methods, such as through adhesive bonding, welding, cold deforming, the latter through for instance flanging, or through another known and suitable method. Provided that a connecting means is used, the connection is realized clearly between the following elements respectively: force ring, housing lid and connecting means, and another one of these elements. As suitable methods are considered those which will constitute only thermal, mechanical and chemical stress, which do not relevantly change either the electronic components themselves or their arrangement in the fixation in the force sensor device as a result of the connection.

The above described force sensor device is suitable for measurements of forces within the range of greater then 0 up to 50 kN, whereby the optimizations of the utilized components and further developments, such as in respect to the used materials or the force transducer, may render the force sensor device applicable even for greater forces.

The following description of FIG. 1A and FIG. 1B relates to FIG. 1B at all times because of its better visualization, as long as FIG. 1A is not explicitly referred to.

Figure 4:
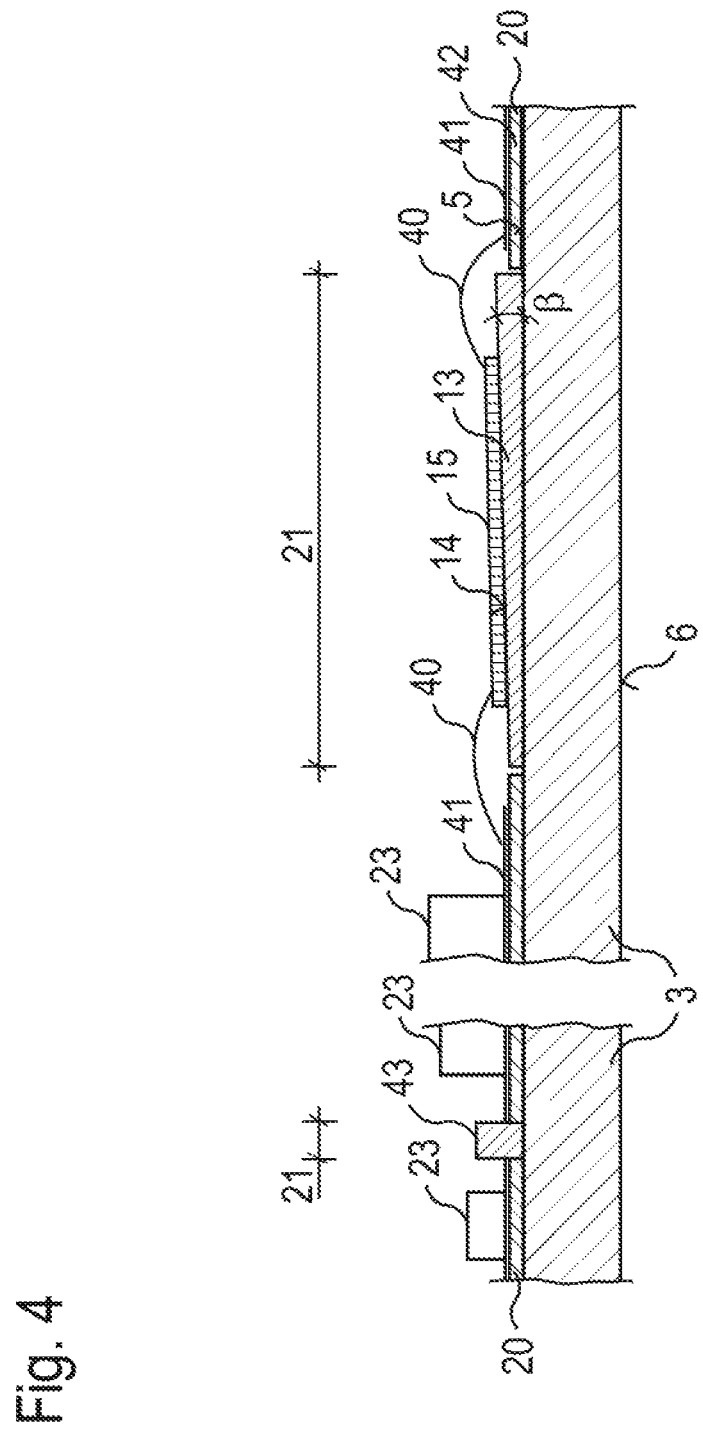
FIG. 4 a sectional view of details of a force ring with a on the force ring arranged circuit board.

The force sensor 1 in FIG. 1A and FIG. 1B comprises a force ring 3 with a trough-shaped profile. Its inner bottom surface is the support surface 5, whose outer bottom surface is the force application surface 6 (FIG. 1A). The cylindrical-shaped outer wall 8 and the cylindrical-shaped inner wall 9 include sealing surfaces 10 for the support of ring-shaped sealing rings 11, an inside and an outside one. On the support surface 5, two force transducers 15 are arranged adjacent to each other on a shared pedestal 13. The pedestal surface, on which the force transducers 15 are arranged, can be at an angle $\beta$ in relation to the support surface 5 within the range of $0°<\beta\leq1°$ (as illustrated in FIG. 4), for instance at an angle of $0.5°$. Both force transducers 15 are operated redundantly by exposing them to the same force situation/stress situation.

The outer wall 8 of the force ring includes a cold deformable, ring-shaped connecting means 17 at its upper end.

A ring-shaped circuit board 20 is mounted extensively onto the support surface 5 by means of flexible glue 42 (as illustrated in FIG. 4). In addition, the geometry of the circuit board 20 correlates with the geometry of the support surface 5 and has a recess 21 in the area of the pedestal 13, through which the pedestal 13 protrudes in the assembled state.

Electronic components 23 of two circuits are arranged on either side of the recess 21, one for each of the two force transducers 15 respectively. Their electrical connection to the respective circuits may be realized, for instance, by means of wire jumpers 40 (as illustrated in FIG. 4).

The embodiment includes contacts 25, for instance spring contacts, being configured at a distance from the circuits and being connected with the latter by means of conducting structures 41, which are configured on the circuit board 20 (as illustrated in FIG. 4).

The force sensor device 1 is closed upwards through a ring-shaped housing lid 30, which has an outer lateral surface 38 and an inner lateral surface 39. Both lateral surfaces 38, 39 correspond to the sealing surfaces 10 of the outer and inner walls 8, 9 of the force ring 3, so that the lateral surfaces 38, 39 are connected with the force ring 3 each via a respective sealing ring 11 in the assembled state. The housing lid further includes a plug 31, which serves as an external connection of the force sensor device 1 and which correlates with the contacts 25 on the circuit board 20.

For the assembly of the force sensor 1, the circuit board 20 is glued onto the support surface 5 as described above, the sealing rings 11 in the housing are placed on the respective sealing surface 10 of the inner and the outer wall 8, 9 of the force ring 3, and, finally, the housing lid 30 is put on, whereby the outer and inner wall 38, 39 of the housing lid 30 rest on the sealing rings 11 and the outer wall 38 is surrounded by the connecting means 17 of the force ring 3. Through cold deforming, the, for instance metallic, connecting means 17 is pressed with the housing lid 30, so that the connecting means overlaps with the top surface 37 of the housing lid 30 along its rim (flanging).

FIG. 2 shows a perspective view of such a force sensor device 1, which differs from that in FIGS. 1A and 1B through an angled design of the plug 31. For the remaining, it is referred to the description of FIGS. 1A and 1B.

Figure 3:
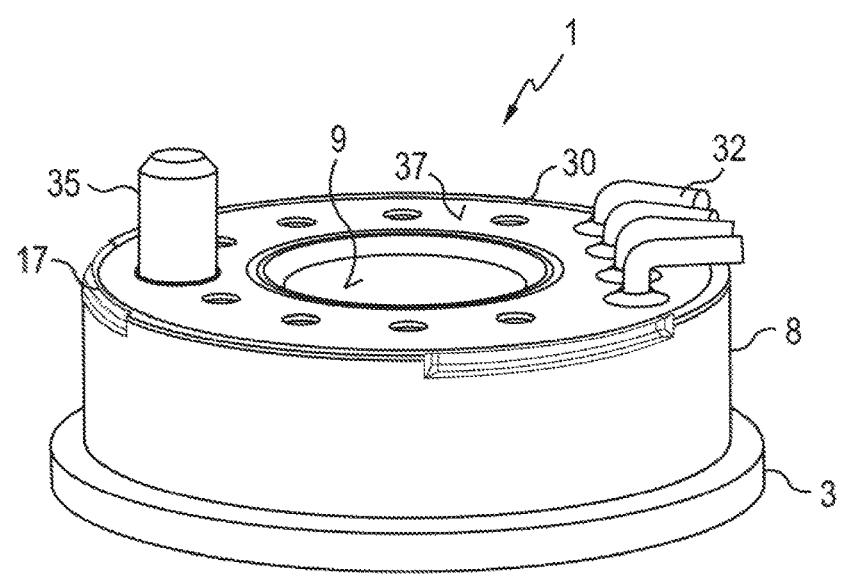
FIG. 3 a perspective view of another embodiment of a force sensor device.

FIG. 3 shows a perspective view of an alternative embodiment of the force sensor device 1. It differs from that in FIGS. 1A and 1B among other things through the realization of the electrical connection of the force sensor device 1. Instead of the plug, this force sensor device 1 includes several connecting cables 32, which are firmly attached to the housing lid 30, as well as a positioning means 35 on the top surface 37 of the housing lid 30 in form of a spike. The connecting cables 32 may also be realized in another known and suitable way. For instance, the individual connecting cables 32 may be led out of the housing as flexible sheathed cables.

FIG. 4 shows a section of the force ring 3 in a sectional view. The force ring 3 includes a plate-shaped base area with a low-lying force application surface 6 and an opposite the force application surface 6 lying and therefore upper-lying support surface 5. A circuit board 20 is glued by either full-surface adhesion or partial adhesion onto the support surface 5 by means of glue 42.

The circuit board 20 includes several recesses 21. Through one of the recesses 21, a pedestal 13 protrudes, whose pedestal surface 14 has an angle β of 0.8°. On the pedestal surface 14, a force transducer 15 is arranged. This is connected with conducting structures 41 of an electronic circuit 23, illustrated through components, via wire jumpers 40.

A support means 43 in form of a pin protrudes through another recess 21 in the circuit board 20, which protects the circuit board 20 against twisting.

The invention claimed is:

1. A force sensor device for determination of a measurement value of a force as well as for generation of an electrical signal, based on the measurement value, comprising:

a force ring having an external force application surface, relative to the force sensor device, for picking up the force to be measured and an internal support surface, relative to the force sensor device;

a circuit board on which passive and active electronic components are arranged;

the circuit board being fixated mechanically or adhesively onto the support surface such that a permanently consistent fixation of the circuit board onto the support surface is realized without an additional component of the force sensor device;

at least one force transducer electrically connected with the circuit board and arranged and configured at the force ring in such a way that the at least one force transducer measures deformations of the force ring as a result of an axial force applied on the force ring;

a housing lid connected with the force ring, so that the force ring and the housing lid enclose the circuit board and the force transducer; and an external connection for picking up of the electrical signal.

2. The force sensor device according to claim 1, wherein the force ring is configured as a board having two opposite lying surfaces forming the force application surface and the support surface, respectively, or with a trough-shaped profile.

3. The force sensor device according to claim 1, wherein the force ring is configured with a trough-shaped profile and the internal support surface comprises an even, inner bottom surface located between upright side walls of the force ring.

4. The force sensor device according to claim 1, wherein the support surface is configured in such a way that a section of the support surface supporting the at least one force transducer comprises a pedestal that lays above a surrounding support surface and has an inclination within a range of 0<β≤1° relative to the surrounding support surface.

5. The force sensor device according to claim 1, wherein the force ring is connected with the housing lid through a connecting means arranged at the force ring or at the housing lid, or which is configured as a separate component of the force sensor device.

6. The force sensor device according to claim 5, wherein one of the following elements: the force ring, the housing lid, and the connecting means is connected with another of said element through gluing, welding or cold deforming.

7. The force sensor device according to claim 1, wherein the force ring includes at least one support means for said permanently consistent fixation of the circuit board onto the support surface, and/or for securing of a position of the circuit board relative to the support surface to realize mechanical shift protection and/or twist protection of the circuit board.

8. The force sensor device according to claim 1, wherein the force sensor device includes a positioning means for securing a position of the force sensor device in an installation position, via one outer wall surface of the force sensor device.

* * * * *